UNITED STATES PATENT OFFICE.

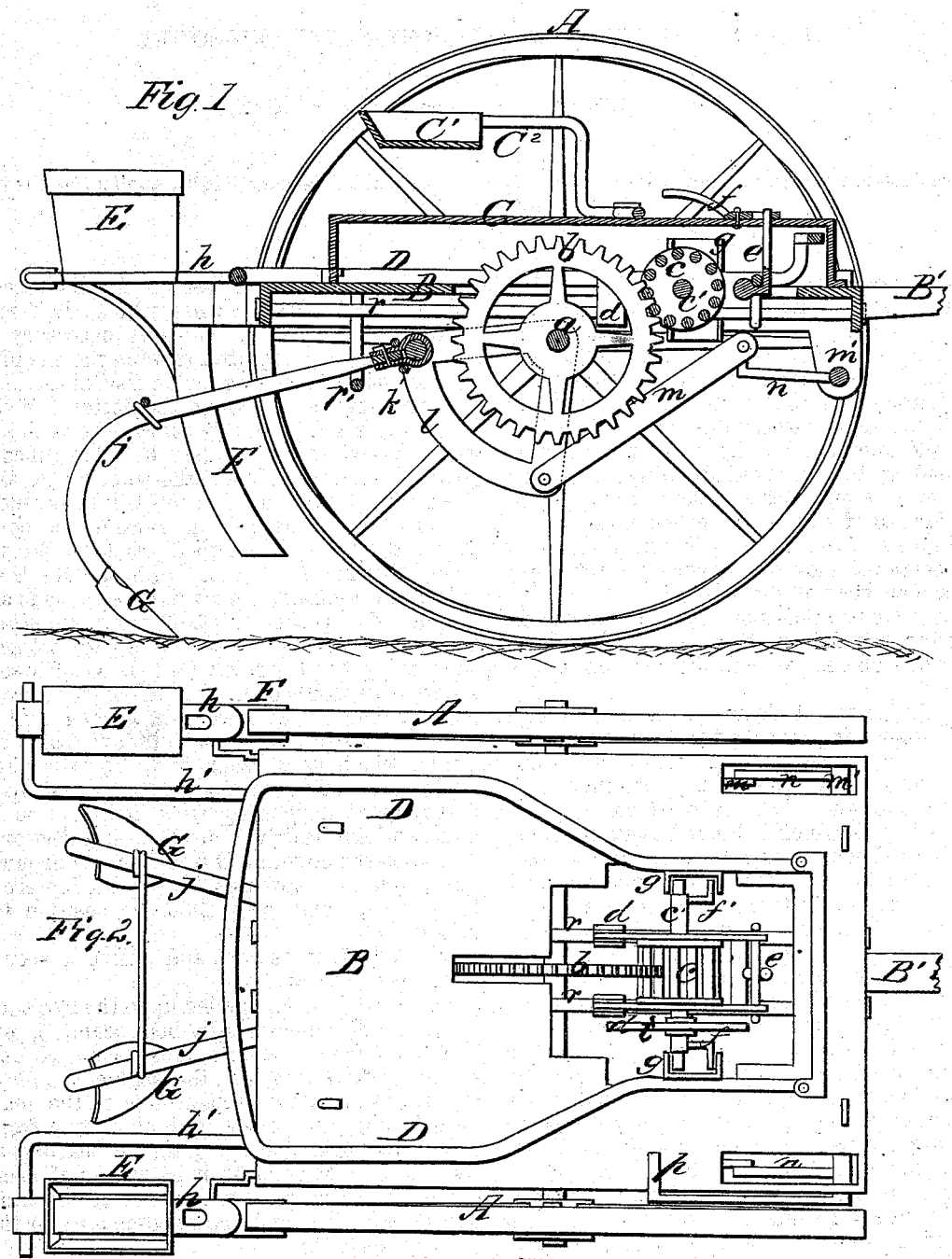

OLIVER P. WILLIAMS, OF EUGENE CITY, MISSOURI.

IMPROVEMENT IN CORN-PLANTERS.

Specification forming part of Letters Patent No. 158,557, dated January 5, 1875; application filed July 11, 1874.

*To all whom it may concern:*

Be it known that I, OLIVER P. WILLIAMS, of Eugene City, in the county of Carroll and State of Missouri, have invented a new and valuable Improvement in Corn-Planters; and I do hereby declare that the following is a full, clear, and exact description of the construction and operation of the same, reference being had to the annexed drawings making a part of this specification, and to the letters and figures of reference marked thereon.

Figure 1 of the drawing is a representation of a sectional view of my corn-planter. Fig. 2 is a plan view of the same.

This invention consists in certain means for enabling the driver to raise or depress the covering-blades, as will be hereinafter explained.

In the annexed drawings, A A designate two transporting-wheels, which are applied on an axle, $a$, so that one of the wheels turns this axle. B designates a platform, and B' the draft-tongue. On the platform is a box or housing, C, which is hinged at its rear end, and held down by turn-buttons at its front end. This box C, which covers and protects the gearing, hereinafter explained, has a driver's seat, $C^1$, mounted on it, which is longitudinally adjustable on horizontal bars $C^2$. On the axle $a$ a large spur-wheel, $b$, is keyed, which is intended for driving a trundle-wheel, $c$, on a transverse shaft, $c'$, which shaft has its end bearings in a frame, $d$, which is free to be moved forward and backward on guide-rods $r$. Frame $d$ is movable for the purpose of engaging wheel $c$ with wheel $b$, or effecting a disengagement thereof, and such movement is performed by means of a pin, $e$, rising from frame $d$, and entering a curved slot through a foot-lever, $f$, on the box C. The ends of the shaft $c'$ have tappets $f'$ fixed to it, which, as they revolve, give forward and backward movements to two vertical guides, $g g$. These guides are rigidly secured to the arms of a longitudinally-sliding yoke or frame, D, which slides on the platform B, and is connected to two seed-dropping slides, $h h$, by means of angular arms $h' h'$. The shaft $c'$ of the trundle-wheel $c$ has a hand-wheel, $i$, keyed on it, by which the driver on the box C can operate the slides $h h$ when wheel $c$ is disengaged from wheel $b$. This is necessary in commencing to drop after turning the machine at the ends of the rows. The seed-slides play back and forward through the bottoms of the seed-hoppers E E, and discharge the grains of corn through curved tubes F. The tubes F are arranged in line with the wheels A A, and the peripheries of these wheels will be beveled, so as to open channels to receive the corn. After the corn is dropped earth is thrown over it by means of two covering-blades, G G, which are secured to curved bars $j j$, that are connected together at their front ends and pivoted to a cross-bar, $k$, secured to two segments, $l$, that play freely on axle $a$. The segments $l$ are connected, by links $m$, to a front rocking bar, $m'$, by means of arms $n$, and to one end of this bar $m'$ a hand-lever, $p$, is secured, which is in reach of the driver when on his seat. The bars or beams $j j$ rest upon a stirrup, $r'$, depending from the platform B, so that when the driver moves lever $p$ forward, he raises the coverers G free from the ground, and when he depresses lever $p$ he depresses the coverers, and puts them in position for operation.

What I claim as new, and desire to secure by Letters Patent, is—

The coverers G G, applied upon the free ends of a U-shaped downwardly-bent beam, $j j$, pivoted at its front end to a cross-beam, K, and sustained by stirrups $r'$, the segments $l$ playing freely on axle $a$ at each side of the platform B, and connected, by links $m$, to a front transverse rocking bar, $m'$, having bearings at each side of the platform by means of arms $n$, and the lever $p$ on one end of the rocking bar $m'$, combined and arranged as and for the purpose specified.

In testimony that I claim the above I have hereunto subscribed my name in the presence of two witnesses.

OLIVER PERRY WILLIAMS.

Witnesses:
   C. McWILLIAMS,
   JNO. H. HAWS.